United States Patent [19]

Kupcikevicius

[11] Patent Number: 4,516,387

[45] Date of Patent: May 14, 1985

[54] APPARATUS FOR STUFFING LARGE MEAT ARTICLES

[75] Inventor: Vytautas Kupcikevicius, Chicago, Ill.

[73] Assignee: Union Carbide Corporation, Danbury, Conn.

[21] Appl. No.: 364,075

[22] Filed: Mar. 31, 1982

[51] Int. Cl.³ .................. B65B 63/02; B65B 3/12; B65B 3/18

[52] U.S. Cl. .................. 53/530; 17/38; 17/33; 53/576

[58] Field of Search ........... 53/512, 576, 530, 258; 17/33, 38

[56] References Cited

U.S. PATENT DOCUMENTS

| | | | |
|---|---|---|---|
| 2,977,732 | 4/1961 | Leonard et al. | 53/530 |
| 3,065,585 | 11/1962 | Rumsey, Jr. | 53/124 |
| 3,115,733 | 12/1963 | Tipper | 53/124 |
| 3,384,007 | 5/1968 | Boje et al. | 53/530 X |
| 3,621,775 | 11/1971 | Dedio et al. | 53/530 X |
| 3,802,337 | 4/1974 | St. Hiliare | 53/530 X |
| 3,919,739 | 11/1975 | Kawai | 53/530 X |
| 3,945,171 | 3/1976 | Marietta, Jr. et al. | 53/512 X |

*Primary Examiner*—Horace M. Culver
*Attorney, Agent, or Firm*—John R. Doherty

[57] ABSTRACT

A multistage piston assembly is provided in apparatus for stuffing large meat articles in flexible tubular food casing. The piston assembly is mounted in longitudinally axial alignment with the article-loading chamber and stuffing horn and includes a first stage piston and a second stage piston coaxially mounted inside the first stage piston. During the first stage of operation, the two pistons move together to force the meat article through the article-loading chamber and into the stuffing horn. The second piston is then actuated to force the meat article through the stuffing horn and into the food casing. In order to prevent loss of liquid from the meat article during the stuffing operation, the two pistons are constructed so that they fit snugly inside the loading chamber and stuffing horn with minimum clearance and also are made to be substantially coextensive in the longitudinal direction with both the chamber and horn.

11 Claims, 9 Drawing Figures

APPARATUS FOR STUFFING LARGE MEAT ARTICLES

TECHNICAL FIELD

The present invention relates to the stuffing of large meat articles into shirred casing and more particularly relates to the stuffing of large muscle groups such as whole boneless ham.

Boned hams are the principal commercial example of large muscle groups for stuffing. The manufacture and shirring of large diameter casings for boned hams is much the same as for large diameter sausages, but the stuffing requirements differ. For one thing, in ham stuffing, proper orientation of the meat mass is required so that the meat fibers of the grouped muscles or muscle portions are lined in a desired direction and the fat cover, if any, remains properly oriented. It is advantageous, for example, to have the meat fibers normal to the slicing plane of the stuffed product, a consideration not involved in the stuffing of sausages with emulsion.

BACKGROUND ART

In the meat packing industry, whole boneless meat articles, such as hams, have been packed into lengths of tubular food casing and tied off at the ends to make discrete unitary packaged food articles. Such packaging techniques generally have involved slow and labor intensive operations. In such practice, a whole boneless meat article, a ham typically, is manually inserted loosely into a cut length of presoaked casing which has been pretied or clip-closed at one end. Insertion of the ham into the casing is accomplished manually or is assisted by means of one or another commercially available meat presses. In a subsequent pressure packing operation, the ham is tightly packed within the casing, simultaneously expelling entrapped air and shaping the ham. The operator may also "stick" the casing during the pressure packing operation, providing holes to further assist in expelling air from within the packed casing. The open end of the packed casing is then tied or clip-closed to complete the encased food article. Typical pressure packing techniques for boneless meat articles are shown and described in U.S. Pat. Nos. 3,115,733 to Tipper and 3,065,585 to Rumsey, Jr. Somewhat greater automation in the boneless whole meat article stuffing technology is shown and described in U.S. Pat. No. 3,919,739 to Kawai. Kawai utilizes a continuous band casing soaker in combination with a carriage means to continually put the open casing end into registration with a nozzle of a packing element. With the casing soaked and thus in place, a meat article is loosely packed into the temporarily held casing length. After a first clip is applied, the unclipped end of the packed casing is pulled tight around the meat article thereby shaping said meat article and expelling air entrapped within said packed casing. The unclipped end of the casing is then tied or clip-closed and the resulting encased meat article is severed from the casing supply feed length.

While the Kawai '739 apparatus represents an advance towards the goal of automatic ham stuffing, it does not provide a completely satisfactory technique. A significant disadvantage lies in the feeding of the casing being stuffed in a direction opposite the direction of progression of the articles being stuffed. Each stuffing action constitutes a sort of head on collision between the ham and the casing length into which it is to be packaged. Since, because of the apparatus design, there is no way to continually stuff the continuous casing band in a unidirectional mode with the direction of progression of the hams in process, this counterflow relationship between the casing band and the hams constitutes an inherent mechanical inefficiency. Another factor in the '739 patent technique which detracts from efficient packaging is that the hams are inserted into a loosely fitting casing which is subsequently drawn tight to shape the hams and to express air out of the package article.

Haettinger et al. in U.S. application Ser. No. 142,907, filed Apr. 23, 1980 and assigned to the same assignee as this application, discloses a method and apparatus for stuffing whole boneless meat articles, such as hams, into fibrous casing which avoid most of the inefficiencies and drawbacks of the prior art. As disclosed in Haettinger et al., a boneless meat article is arranged in a meat loading chamber with the meat fibers and fat cover, if any, properly oriented, and the chamber door is then closed and locked. The meat article is then compressed in the chamber and assumes a generally cylindrical shape. A two-stage piston first forces the article to be encased out of the chamber into a stuffing horn or tube and next forces the article through the stuffing horn into the preclipped end of the shirred casing supply. A second tie clip is then applied to close the casing.

The method and apparatus for inserting whole boneless meat articles, such as hams, into a shirred casing in accordance with Haettinger et al. are advantageous in that they allow for the continuous escape of air which otherwise tends to become entrapped during the insertion or stuffing process and further they permit gathering and clipping the open end of the stuffed casing while maintaining the encased product in a pressurized condition. In addition, the method and apparatus of Haettinger et al. contemplate a continuously repeating cycle wherein the deshirred end of a continuous succeeding preshirred casing is further gathered and clipped, and the completed stuffed product is severed from the succeeding casing.

Many whole, boneless meat articles are required to be packaged in food casing along with various types of preservatives, flavor-enhancers and other similar ingredients. These ingredients may be added to the meat article as a liquid or solid but in either case they usually readily dissolve in the natural juices or brine and the resulting liquidous product is generally referred to simply as "pickle". This pickle, after the meat article has been "pumped" and prepared for stuffing, will usually contain a small percentage of minute meat particles which tend to increase the viscosity of the solution. However, in most cases, the pickle flows easily amongst the pores of the meat article and will exude when the article is placed under compression in the meat loading chamber. Fortunately, most of the exuded pickle will be forced into the stuffing horn and eventually guided along with the meat product to the food casing. Consequently, the pickle loss will ordinarily not be significant enough to endanger the packaged meat article. However, in those instances where a large number of meat articles are to be packaged using the same stuffing apparatus, the exuded pickle tends to collect inside the apparatus and eventually escapes to the outer environment where it can cause troublesome cleaning and handling problems. Moreover, the pickle can corrode various metal parts, bearings and seals used in the apparatus and shorten their life.

In actual practice, most of the pickle that is lost during packaging escapes past the two-stage piston as it moves through the stuffing horn and collects behind the piston. During the next succeeding stroke, the piston is withdrawn and forces the pickle from inside the apparatus.

It is an important object of the present invention to provide an automatic, meat stuffing apparatus of the type described which aids in retaining most, if not all, of the pickle inside the packaged meat product.

Another object of the present invention is to provide an automatic stuffing apparatus of the type described which further permits whole, boneless meat articles to be effectively packaged and sealed along with all of the intended preservatives, flavor-enhancers and other ingredients which are necessary to maintain high quality even after prolonged periods of storage.

Another object of the present invention is to provide such an automatic stuffing apparatus which protects most metal parts, bearings and seals from contact with corrosive pickle that might otherwise exude from the meat articles to be packaged.

Another object of the present invention is to provide such an automatic stuffing apparatus which is relatively simple in construction and operation, which employs a minimum number of parts and which does not necessarily increase cost.

DISCLOSURE OF INVENTION

In accordance with the present invention, there is provided an improved automatic, meat stuffing apparatus of the type described which will enable the packaging of whole boneless meat articles into discrete lengths of flexible tubular casing. The apparatus of the present invention comprises, in combination: a frame; a stuffing horn mounted on the frame, having a discharge end and an inlet end; an article-loading chamber in communication with the inlet end of the stuffing horn; a compression bar extending longitudinally in the article-loading chamber, movable between a retracted position and an extended position; piston means disposed in longitudinally axial alignment with the article-loading chamber and stuffing horn for forcing the article therethrough; and a supply of casing to be stuffed over the discharge end of the stuffing horn in the direction of progression of the articles being packed.

The apparatus of the present invention preferably utilizes a multistage piston assembly including a first and second piston, each having its own article contacting face. The first stage piston is disposed in longitudinally axial alignment with the article-loading chamber and is movable between a first position wherein its article contacting face is disposed at the rearward end of the article-loading chamber, and a second position wherein its article contacting face is disposed at the inlet end of the stuffing horn. The second stage piston is disposed coaxially within the first stage piston and is reciprocally movable between a first position wherein its article contacting face is disposed at the inlet end of the stuffing horn and a second position wherein its article contacting face is disposed at the stuffing horn discharge end.

The article-loading chamber used in the apparatus of the present invention also preferably includes a chamber door and means for closing, locking and reopening the door, along with the compression bar for laterally compressing the meat articles placed within the chamber. The rearward end of the article-loading chamber connects to the multistage piston assembly comprising the first and second pistons.

The multistage piston assembly is adapted to be advanced and retracted longitudinally in axial alignment with the article-loading chamber and the stuffing horn. The first stage of the piston array is adapted to move through the article-loading chamber to the inlet end of the stuffing horn and thereby advance the meat article to be packaged from the article-loading chamber into the stuffing horn. The second stage of the piston array moves concentrically through the first stage piston through the stuffing horn to its discharge end thus further advancing the meat article completely into a deshirred length of the prepackaged food casing article. The movement of the second piston begins after completion of the movement of the first piston.

The first stage piston includes an elongated tube or sleeve which has mounted at its forward end an annular piston head carrying an article contacting face. The article contacting face is contoured to mate with the inlet end of the central support tube after the first stage piston has completed its forward stroke inside the meat loading chamber. The elongated tube and annular piston head are both made to a size which will fit snugly inside the article-loading chamber after the compression bar has been fully extended to press the meat article. The elongated tube and piston head are also made to a length such that when assembled together the two are substantially coextensive in the longitudinal direction with the meat loading chamber. It is important to note that by this construction, the whole interior of the meat loading chamber will be taken up for the most part by the first stage piston after it has completed its first stroke. Consequently, there will be essentially no void spaces left in the chamber which might otherwise retain portions of the meat article or pickle. In addition, a seal such as an O-ring may be provided around the outer surfaces of the annular piston head to further assure against the passage of pickle around the piston as it moves through the article-loading chamber. Similarly, a seal such as a ring seal may also be provided around the rearward end of the article-loading chamber to seal the chamber and wipe the first piston as it is withdrawn from the chamber.

The second stage piston is similarly elongated and tubular and is arranged concentrically inside the first stage piston. The second piston is adapted to move longitudinally through the central opening in the annular piston head of the first stage piston and into the stuffing horn. The forward end of the second stage piston carries an article contacting face which is preferably flat so as to enable the piston to most effectively force the meat article through the stuffing horn and into the preclipped shirred casing.

In a similar fashion, the second stage piston is made to a size which will fit snugly inside the stuffing horn but without prohibiting its movement therethrough. Also, in similar fashion, the second stage piston is made to a length such that the piston will be substantially coextensive in the longitudinal directional with the stuffing horn from its inlet to its discharge end. Again, it is important to note that by this construction, the whole interior of the stuffing horn will be taken up by the second stage piston at the conclusion of its forward stroke. Consequently, there will be essentially no void spaces left in the stuffing horn which might otherwise contain portions of the meat article or pickle. In addition, a seal such as an O-ring may be provided around the forward end of the second stage piston so as to aid in preventing the passage of pickle around the piston as it moves through the stuffing horn.

The apparatus of the present invention advantageously employs a pneumatic cylinder as a means to actuate and move the second stage piston into and through the stuffing horn in a manner similar to that disclosed in Haettinger et al., supra, but the construction of the piston is entirely different. For instance, in the earlier apparatus, the second stage piston comprises a circular disk attached to the outer end of the actuating rod which extends outwardly from the forward end of the pneumatic cylinder. However, it has been found advantageous in the present apparatus to reverse the position of the pneumatic cylinder so that its normally rearward end faces in a direction toward the stuffing horn and to utilize the cylinder itself as an active movable piston element. The actuating rod for the pneumatic cylinder in this case extends outwardly in a direction opposite the stuffing horn and is permanently anchored at its outer end to serve as a stationary support. Conduit means may be provided inside the actuating rod and provide an ingress and egress for pressurized air to actuate the pneumatic cylinder.

The present invention will now be described in greater detail with particular reference to apparatus of the type described in Haettinger et al., supra, utilizing a stuffing horn assembly including a central support tube upon which is mounted a supply of shirred casing. However, it will be understood that the present invention is not restricted to such apparatus and may be utilized as well in conjunction with other types of apparatus such as that disclosed and claimed in application Ser. No. 261,313 of J. H. Beckman et al., filed May 1, 1981.

DETAILED DESCRIPTION

Figure 2:
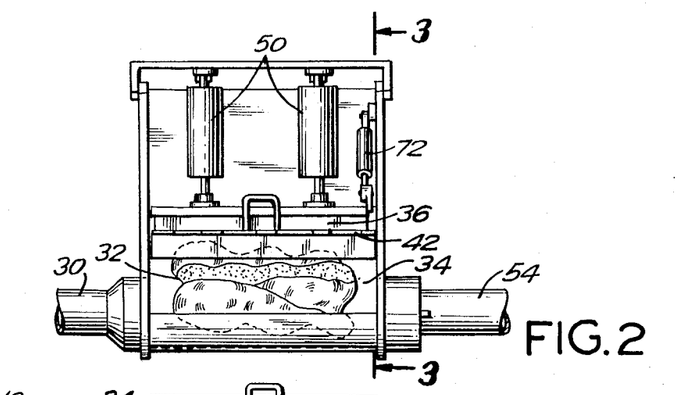
FIG. 2 is a top view of part of the apparatus shown in FIG. 1, showing the manner in which the meat article to be packaged is initially put under compression.
Figure 3:
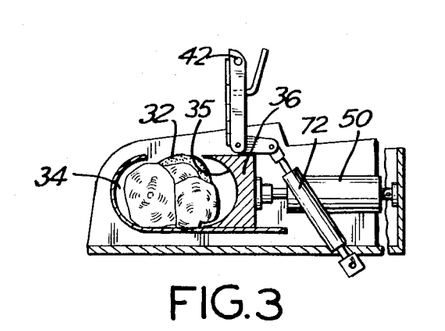
FIG. 3 is a sectional view of part of the apparatus shown in FIG. 2, taken along lines 3—3, showing an end view of the loading chamber and meat compression apparatus.

Referring now to the drawing, there is shown an embodiment of an improved automatic meat stuffing apparatus in accordance with the present invention. As shown, the apparatus comprises a frame 16 on which is mounted a stuffing horn assembly 18. The stuffing horn assembly comprises in turn a central support tube 30 disposed coaxially within the stuffing horn assembly, having a discharge end 29, and a flared inlet end 31. Rearward and communicating with the flared inlet end 31 of the central support tube 30 is an article loading chamber 34. Article loading chamber 34 has a door or other closure means 42 which lifts hingedly or slideably to permit access to the article loading chamber. When the door 42 of article loading chamber 34 is in its fully open position, the chamber appears as shown in FIG. 2, that is to say with its maximum volume condition available for loading the article to be packed. FIG. 3 of the drawing shows an end view of the apparatus in this condition. Loading chamber door lock cylinders 48 are provided to secure the door 42 in the closed position. An article compression bar 36 extends longitudinally of the article-loading chamber 34 and is provided with a formed face 35. Compression bar 36 is actuated reciprocally by lateral compression bar cylinders 50 shown in FIGS. 2 and 3 in the retracted position. When these actuating cylinders are energized the compression bar 36 is extended to the position shown in FIG. 5 of the drawing wherein the formed face 35 defines a wall portion of the article-loading chamber 34.

A multiple stage piston assembly is mounted on the frame 16. This piston assembly includes a first elongated, tubular piston 54 and a second elongated, tubular piston 58, arranged in alignment with the article-loading chamber 34 and with the central support tube 30 of the stuffing horn assembly 18. As shall be described in greater detail hereinafter, the second elongated tubular piston 58 is made from a pneumatic cylinder which is arranged coaxially within the first elongated tubular piston 54. It will be seen then that by this arrangement the first and second pistons 54, 58, operate in two stages, one stage to push the laterally compressed meat article in the forward direction through the loading chamber when it is closed, into and through the flared end of the central support tube 30 and then, in the second stage of operation, completely through the central support tube to the discharge end thereof. The meat article is then placed into contact with the clipped end of the casing being filled. In order to avoid the possibility of trapping portions of meat between the forward end of the first piston 54 and the flared inlet end 31 of the central support tube 30, the face of the second tubular piston 58 should not be allowed to extend beyond the first piston 54 until the forward motion of first piston has been fully completed.

A shirred casing stick 22 is coaxially disposed on a support sleeve 24 of the stuffing horn assembly 18. The casing mounted in this manner is controlled with regard to its movement by means of a sizing disk 26 mounted in a retainer recess in the support sleeve 24 and its position is controlled with regard to maintaining feed pressure as it is being deshirred by means of a casing slack cylinder 68. The operable features and characteristics of the casing stick 22 as it is controllably deshirred in this manner are the same as those explained in U.S. Pat. No. Re. 30390. A snubbing carriage 20 is provided at the front or discharge end of the apparatus and comprises clipping means 70 and 74 and severing means 76 to clip the casing discrete lengths closed and to sever between clipped sections so as to make individual lengths of product 78. Another automatically actuated pneumatic cylinder 56 is arranged with one end fixed and a movable end attached to a yoke 79 which drives the two concentric, tubular pistons 54, 58 through sequential cycles.

The first elongated tubular piston 54 includes a metallic tube 51 and an annular piston head 52 which is mounted to the forward end of the tube. Both the tube 51 and piston head 52 are made to a size which will enable them to fit snugly inside the article-loading chamber 34 when the compression bar 36 has been fully extended but without prohibiting movement of the piston therethrough. As a typical example, it has been found that the tube 51 and piston head 52 should have an outer diameter which is only slightly less than the inside diameter of the article-loading chamber 34 providing a clearance between the two of approximately 0.030 inch. The tube 51 should also be made to a length such that the combined tube and piston head are substantially coextensive in the longitudinal direction with the article-loading chamber 34, that is to say, the total length of the two members should be at least about three-quarters of the length of the chamber. In the preferred practice of the present invention, the tube 51 and piston head 52 are made to a length which is at least slightly greater than the length of the article-loading chamber 34 as shown for example in FIG. 7.

Figure 9:
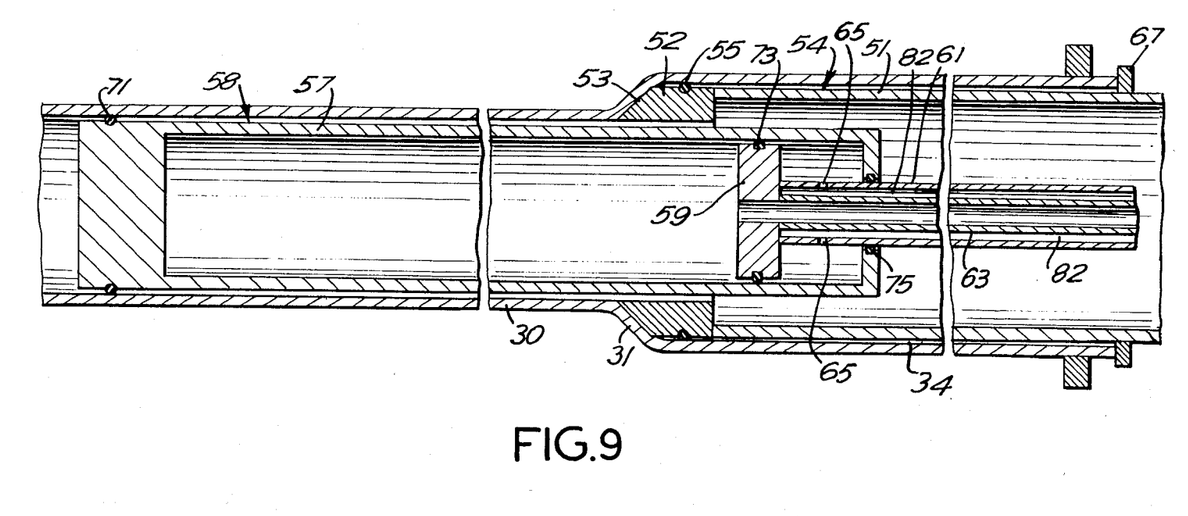
FIG. 9 is an enlarged sectional view of part of the apparatus shown in FIG. 1, showing the two-stage piston assembly in greater detail with the second stage piston extending partly into the central support tube of the stuffing horn assembly.

The annular piston head 52 has an article contacting face 53 of conical shape which mates with the tapered inlet end 31 of the central support tube 30 after the first piston 54 completes its initial stroke through the chamber 34. As best shown in FIG. 9, an O-ring 55 is mounted in a peripheral groove around the outer wall of the piston head 52 and provides an effective seal at the forward end of the piston.

In similar fashion, the rearward end of the article-loading chamber 34 is sealed by a ring seal 67 which tightly surrounds the tube 51. The seal 67 also serves to wipe the tube 51 as the first piston 54 is withdrawn from inside the chamber.

Figure 7:
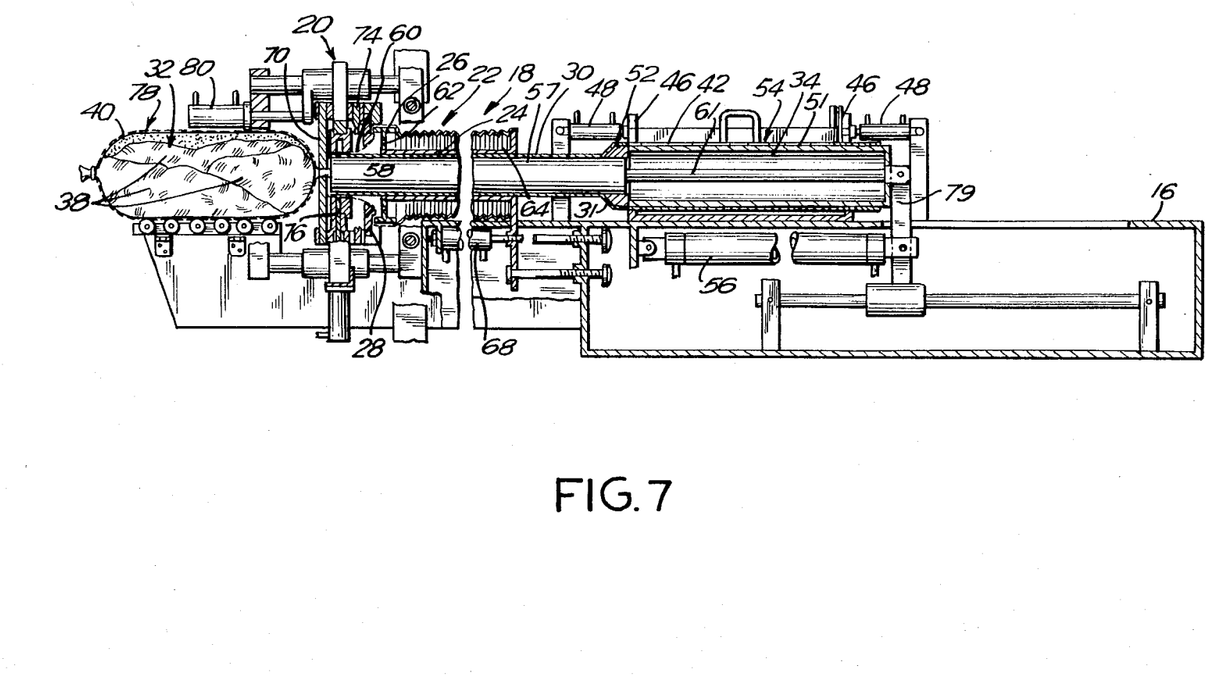
FIG. 7 is similar to FIG. 1, but showing the meat article pushed completely through the stuffing horn and into the casing by the action of a second stage piston.

The second elongated tubular piston 58, as indicated above, is a pneumatic cylinder which is coaxially mounted inside the first piston 54. The pneumatic cylinder includes an outer tubular wall 57, a closed end and an inner circular piston disk 59 which is attached to one end of a hollow tubular actuating rod 61. The rod 61 extends outwardly through an opening in the opposite end of the tubular wall 57, it being noted at this point that the cylinder 57 is ordinarily held stationary with this end of the cylinder facing in a forward direction in order to accommodate movement of the rod 61. However, it will be readily seen from several views of the drawing that in fact the opposite is true in the case of the present apparatus. Thus the tubular wall 57 of the pneumatic cylinder is used in the present apparatus as the active movable piston element with the rod 61 held stationary as best shown in FIG. 7. The outer end of the rod 61 extends through an opening in the closed rearward end of tube 51 and is permanently fixed to the yoke 79 which is driven by the pneumatic cylinder 56.

The tubular wall 57 for the pneumatic cylinder is similarly made to a size which will enable it to fit snugly inside the central support tube 30 but without prohibiting movement therethrough. Again, as a typical example, it has been found that the tubular wall 57 should have an outer diameter which is only slightly less than the inside diameter of the central support tube 30 providing a clearance between the two of approximately 0.030 inch. The tubular wall 57 should also be made to a length such that the cylinder is substantially coextensive in the longitudinal direction with the tube 30, that is, the length of the wall 57 should be at least about three-quarters of the length of the tube 30. In actual practice the tubular wall 57 should be made to a length which is at least slightly greater than that of the tube 30. An O-ring 71 may be provided in a groove around the forward end of the tubular wall 57 to effectively seal the cylinder inside the central support tube 30.

As shown more particularly in FIG. 9, actuation of the pneumatic cylinder to effect movement of the second stage piston 58 is achieved by provision of an inner tube 63 which extends through the rod 61 and communicates with a center opening in the piston disk 59. Air under pressure passes through the inner tube 63 and enters the forward end portion of the cylinder where it builds up and forces the tubular wall 57 to move in a forward direction into and through the central support tube 30. Conversely, to move the cylinder in the opposite or rearward direction, pressurized air is passed through the annular space 82 between the tube 63 and rod 61 and into the rear portion of the cylinder via the small holes 65 in the forward end of rod 61. The tube 63 and annular space 82 between the tube and rod 61 also serve as a passageway for the egress of air upon displacement of the inner piston 59.

An O-ring 73 may be provided in a groove around the periphery of the piston disk 59 to effectively seal the same inside the tubular wall 57 of the pneumatic cylinder. Similarly, the actuating rod 61 may be effectively sealed at the rearward end of the wall 57 by an O-ring 75.

Operation of the apparatus may be further explained as follows:

The snubbing carriage 20 is moved to the transverse shirred casing loading position (not shown). A prepackaged shirred food casing article 22 is placed on the support sleeve 24, attachment being made via the fingers of the sizing disk 26. The snubbing carriage 20 is then moved transversely so that the central axis of the snubbing ring 28 is aligned with the central axis of the central support tube 30.

Figure 1:
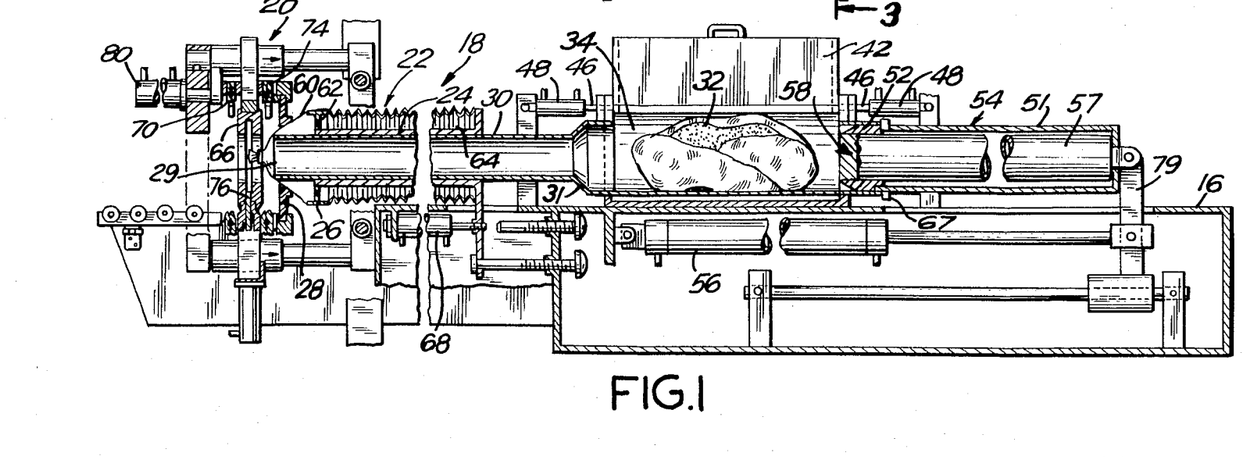
FIG. 1 is a side elevational view, partly in section, of apparatus in accordance with the present invention, showing a boned whole ham in position inside the loading chamber.

With the apparatus in the reset position, FIG. 1, a whole boneless ham 32 is placed in meat loading chamber 34. As shown in FIGS. 2 and 3, the initial position of lateral compression bar 36 allows adequate space laterally, and the depth of the article-loading chamber (approximately 5 inches compared to the central support tube diameter of approximately 4 inches or less) allows adequate depth so that the meat mass can be properly arranged preparatory to stuffing. That is to say the ham muscles 38 are arranged to lie parallel to the direction of stuffing, and the fat cover 40 is positioned so that it remains as the outside layer of the meat mass after stuffing.

Figure 4:
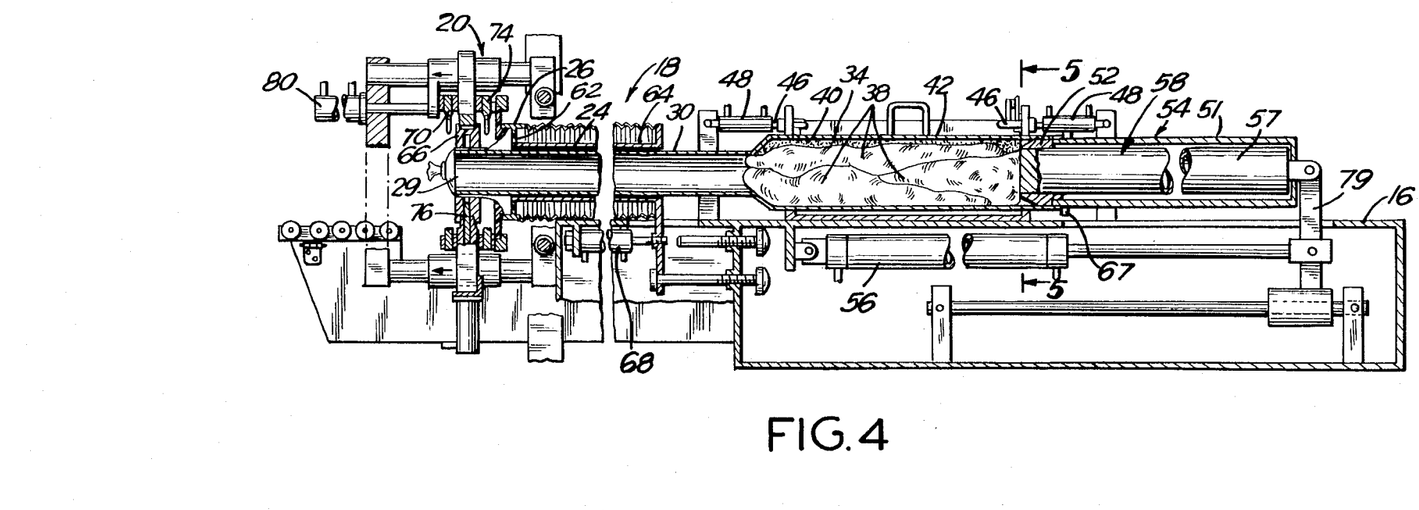
FIG. 4 is similar to FIG. 1, but showing the loading chamber cover closed with lateral compression of the meat article effected.
Figure 5:
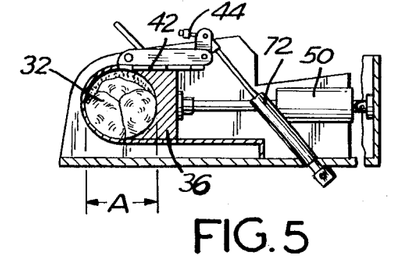
FIG. 5 is a sectional view of part of the apparatus shown in FIG. 4, taken along the lines 5–5, showing an end view of the meat article in the chamber in its compressed condition.

As the meat loading chamber door 42 is closed, limit switch 44 shown in FIG. 5 is activated initiating the machine cycle. All subsequent machine actions are automatically sequenced. The snubbing carriage 20 moves to the stuffing position, as shown in FIG. 4. Meat loading chamber door locks 46 are activated by cylinders 48. The product compression bar 36 is moved laterally by compression bar cylinders 50, compressing the meat mass to initial diameter "A" as shown in FIG. 5. When the lateral compression bar 36 is fully extended, it is locked in place.

Figure 6:
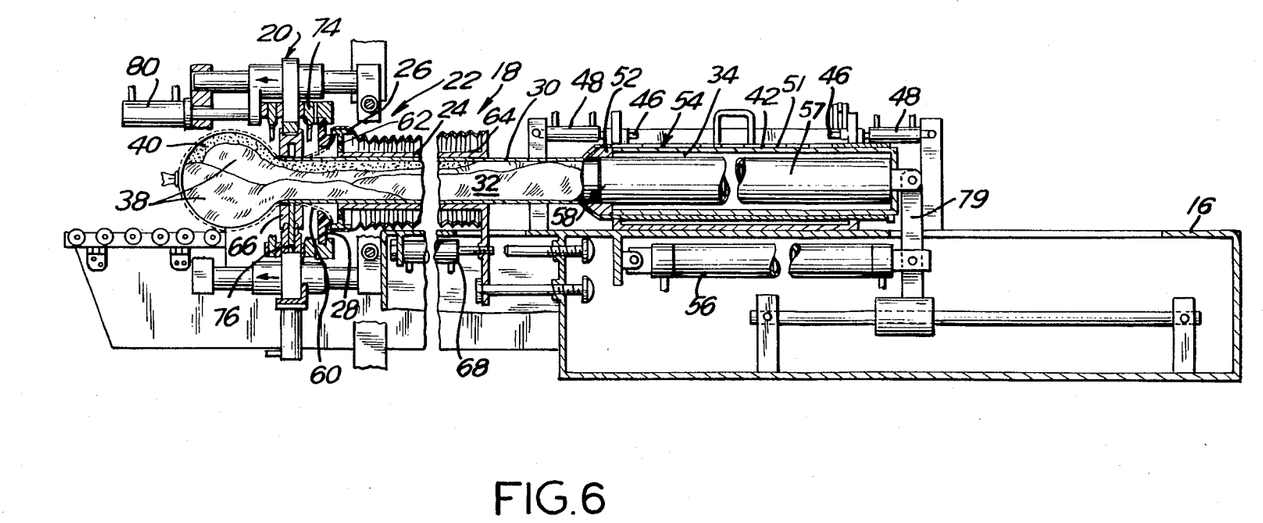
FIG. 6 is similar to FIG. 1, but showing the meat article pushed into and partially through the stuffing horn by the action of a first stage piston.

First-stage piston 54, activated by pneumatic cylinder 56, pushes the meat mass 32 into the central support tube 30, as shown in FIG. 6. At the completion of the stroke of first-stage piston 54, second-stage piston 58 starts pushing the meat mass through the central support tube and into a deshirred section of food casing 60.

As the meat mass is pushed from the meat loading chamber 34 into a deshirred end of the preclipped casing 60, it is preceded by a relatively large volume of air. This volume of air is entrapped between the meat mass and the clipped end of the casing, and is proportional to the volume of the central support tube. Provision must be made for the release of the air as the ham is stuffed into the central support tube and into the casing so as to avoid blowing the clipped end of the casing open. Air escape paths are provided by means of vents 62 in sizing disk 26, allowing entrapped air to pass through the vents and escape between the bore 64 of the shirred casing stick and the outer surface of the support sleeve 24.

Continuous pressurization of the meat mass and size control of the stuffed product are maintained during stuffing through the application of a holdback force. This holdback force may be achieved through the coaction of annular snubbing ring 28 and sizing disk 26 in a manner similar to that described in U.S. Pat. No. 4,077,090. While sealing ring 66 coacts with central support tube 30 to prevent meat product from backflowing into the as yet unfilled zones in the deshirring casing, the clearance between the sealing ring and the central support tube allows the free escape of air from the casing to and through the vents 62 in the sizing disk 26. Pressurization of the meat mass is maintained during stuffing and clipping, eliminating the necessity for a separate and subsequent press-tying operation.

Upon completion of the stroke of the second-stage piston as shown in FIG. 7, the casing slack cylinder 68 extends and retracts the shirred stick mounted on support sleeve 24. This action provides a section of loose casing. The second-stage piston 58 remains in position at the discharge end of the central support tube 30 while slacking takes place, thus maintaining pressurization of the encased product. The casing immediately behind the encased meat product is gathered and clipped by the second tie clipper 70. The compression bar 36 is unlocked as the first-stage piston 54 and second-stage piston 58 are retracted.

Figure 8:
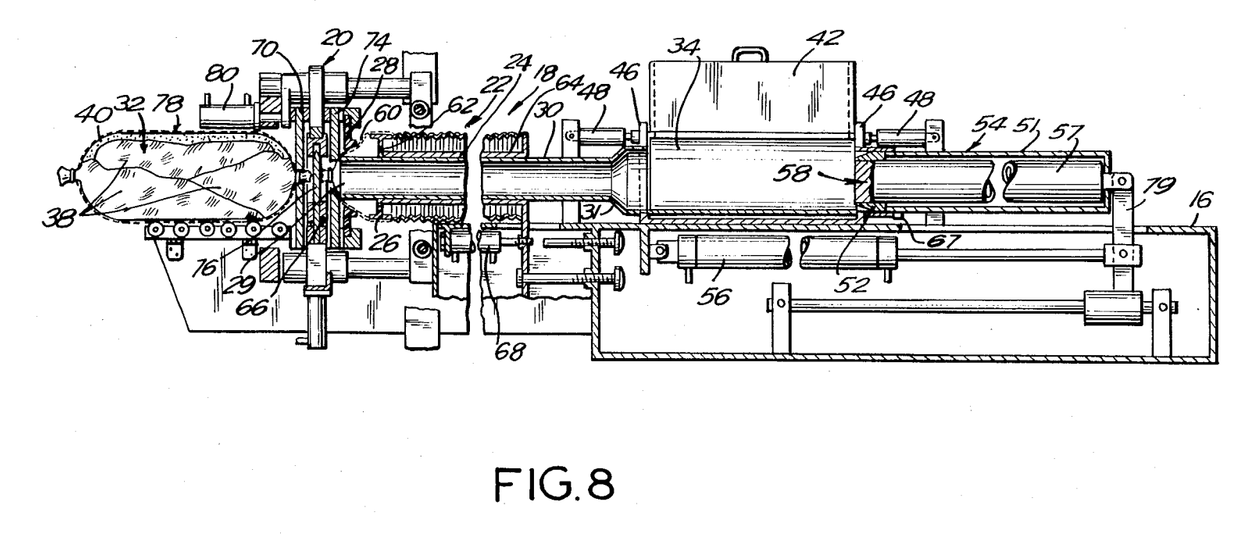
FIG. 8 is similar to FIG. 1, but showing the meat article completely encased, the casing severed, the two pistons fully retracted, and with the loading chamber open.

With the second tie clipper 70 still engaged, the snubbing carriage 20 indexes to the pretie clip position as shown in FIG. 8, carrying the encased product with it. When the first-stage piston 54 has been fully retracted, the lateral compression bar 36 retracts. The article-loading chamber door locks 46 disengage, and the chamber door 42 is opened by pneumatic cylinder 72. The machine is now ready for reloading.

Reloading can proceed as the pretie clip is automatically applied to the loose section of casing behind the clipped-closed stuffed product by the pretie clipper 74. The casing severing knife 76 then severs the casing between the clipped-closed end of the encased product and the pretie clip. Both clippers are then opened and the casing knife is retracted. The snubbing carriage 20 returns to the "stuff" position as shown in FIG. 4, prior to the commencement of stuffing. If the snubbing carriage has not returned to the "stuff" position at the time the "start" limit switch 44 is activated by the manual closing of the article-loading chamber door 42, the stuffing cycle is automatically delayed until the snubbing carriage moves to the "stuff" position.

Apparatus according to the invention can be constructed by employing the same basic details as shown in the figures of the drawing. The structural components are made preferably of stainless steel or aluminum with the plastic part thereof, such as for instance the formed face portion of the lateral compression bar, made of nylon, high density polyethylene or the like suitable materials conventionally used in the handling of food products. Assembly of the parts is made preferably with welding for the rigid parts which are not to be disassembled for routine maintenance and with the parts that are to be disassembled for routine maintenance with nuts, lock washers, etc.

The energy for actuation of the machine may be standard plant air pressure at, for example, 80 psig with control pressure reduced through a pressure reducing station to 50 psig. It has been found through experience that the preferred angle of the tapered edge 31 at the rear of the central support tube 30 which defines the stuffing horn should be about 15° from the horizontal. This presents a gradual reduction in the cross sectional area of the meat which avoids undue jamming or distortion of the muscle structure and fat cover.

Apparatus constructed in accordance with the invention has been successfully operated at stuffing rates of between 8 and 12 hams per minute. With complete training of personnel who operate the machine it is possible to attain a sustained rate of packaging at 10 hams per minute.

In the light of the foregoing disclosure it is conceivable that numerous alternative embodiments of this invention will occur to persons familiar with the art and the disclosure is therefore to be taken as descriptive only and not construed in any limiting sense. For instance, it is entirely possible to apply the concepts of the present invention in apparatus constructed in accordance with the teachings of Beckman et al. in application Ser. No. 261,313, supra, wherein a relatively thin wall, plastic, tubular support serves as a demountable stuffing horn. A shirred casing length is then compacted in place on the tubular support. The present invention may be employed to advantage in this type of apparatus since the elongated tubular pistons which are coextensive with both the article-loading chamber and the stuffing horn serve to provide additional support to the latter when the second stage piston is advanced toward the discharge end of the horn. During this stage of the operation, a vacuum is created behind the piston which might otherwise collapse the walls of the plastic tube.

It is also entirely possible to utilize the features of the present invention in apparatus employing a stuffing horn which is approximately the same size as the article-loading chamber, e.g., about five inches in diameter, for example. It will be evident of course that in such apparatus an elongated, single stage piston would be employed of a size which would fit snugly inside the chamber and the stuffing horn. Also, the elongated single stage piston would have a length such that the piston would be substantially coextensive with both the article-loading chamber and the stuffing horn. Further-more, the piston used in such apparatus would be advantageously made from a pneumatic cylinder utilizing essentially the same arrangement as described hereinabove.

I claim:

1. In an apparatus for stuffing large meat articles into discrete lengths of flexible tubular casing comprising, in combination: a frame; a stuffing horn mounted on said frame, having a discharge end and an inlet end; an article-loading chamber in communication with the inlet end of the stuffing horn; a compression member extending longitudinally in said article-loading chamber, movable between a retracted position and an extended position; piston means disposed in longitudinally axial alignment with the article-loading chamber and stuffing horn, having an article contacting face; actuating means operably connected to said piston means arranged and disposed to move said piston means in multistage operations sequentially in a first stage through said article-loading chamber, and in a second stage through said stuffing horn to the discharge end thereof; and a shirred casing supply disposed coaxially on the stuffing horn arranged and disposed to provide a continuous de-shirred casing to be stuffed with said meat articles; the improvement whereby said meat articles can be packaged without substantial loss of liquidous materials contained in said articles; said improvement comprising, in combination:
   (a) a first stage piston comprising a first elongated tubular member and an annular piston head mounted to the forward end of said tubular member and carrying an article contacting face, said first tubular member and said annular piston head being of a size which will enable both to fit snugly inside the article-loading chamber after said compression member has been moved to its extended position, and having a combined length such that they are substantially coextensive in the longitudinal direction with said article-loading chamber; and
   (b) a second stage piston comprising a pneumatic cylinder having an outer tubular wall forming a second enlongated tubular member having a separate article contacting face, coaxially mounted inside the first elongated tubular member of said first stage piston, the outer tubular wall of said pneumatic cylinder being of a size which will enable it to fit snugly inside said stuffing horn and having a length such that said outer tubular wall is substantially coextensive in the longitudinal direction with said stuffing horn, said pneumatic cylinder including an actuating rod extending outwardly from an end thereof in a direction opposite to the stuffing horn, said actuating rod being permanently anchored in a stationary position.

2. The improvement according to claim 1 wherein said pneumatic cylinder includes an inner circular piston disk separating the interior of said cylinder into at least two portions and means associated with said actuating rod for introducing pressurized air to one portion of said pneumatic cylinder to effect movement of said second stage piston in one direction and for separately introducing pressurized air into another portion of said pneumatic cylinder to effect movement of said second stage piston in an opposite direction.

3. The improvement according to claim 2 wherein said means for separately introducing pressurized air into said pneumatic cylinder comprises an inner tube concentrically mounted inside said actuating rod and communicating with one portion of said pneumatic cylinder through a central opening in said piston disk attached to an end of said actuating rod.

4. The improvement according to claim 3 wherein said means for separately introducing pressurized air into said pneumatic cylinder further includes at least one aperture in said actuating rod communicating between the other portion of said pneumatic cylinder and an annular space defined between said rod and said inner tube.

5. In an apparatus for stuffing large meat articles into discrete lengths of flexible tubular casing comprising, in combination: a frame; a stuffing horn mounted on said frame, having a discharge end and an inlet end an article-loading chamber in communication with the inlet end of the stuffing horn; a compression member extending longitudinally in said article-loading chamber, movable between a retracted position and an extended position; piston means disposed in longitudinally axial alignment with the article-loading chamber and stuffing horn, having an article contacting face; actuating means operably connected to said piston means arranged and disposed to move said piston means in multistage operations sequentially in a first stage through said article-loading chamber, and in a second stage through said stuffing horn to the discharge end thereof; and a shirred casing supply disposed coaxially on the stuffing horn arranged and disposed to provide a continuous de-shirred casing to be stuffed with said meat articles; the improvement whereby said meat articles can be packaged without substantial loss of liquidous materials contained in said articles; said improvement comprising, in combination:
   (a) a first stage piston comprising a first elongated tubular member and an annular piston head mounted to the forward end of said tubular member and carrying an article contacting face, said first tubular member and said annular piston head being of a size which will enable both to fit snugly inside the article-loading chamber after said compression member has been moved to its extended position, and having a combined length such that they are substantially coextensive in the longitudinal direction with said article-loading chamber; and
   (b) a second stage piston comprising a second elongated tubular member having a separate article contacting face, coaxially mounted inside the first elongated tubular member of said first stage piston, said second elongated tubular member being of a size which will enable it to fit snugly inside said stuffing horn and having a length such that said second elongated tubular member is substantially coextensive in the longitudinal direction with said stuffing horn.

6. An apparatus for stuffing large meat articles into discrete lengths of flexible tubular casing comprising, in combination:
   a frame;
   a stuffing horn assembly mounted on said frame and including a central support tube disposed coaxially within said stuffing horn assembly, having a discharge end and a flared inlet end;
   an article-loading chamber in communication with the flared inlet end of the central support tube;
   a closure on said article-loading chamber movable between open and closed positions providing lateral access to said article-loading chamber when in the open position;

a compression bar extending longitudinally of said article-loading chamber, movable between a retracted position and an extended position, having a formed face which defines a wall portion of the article-loading chamber when in said extended position;

actuating means operably connected to move the compression bar selectively into its retracted and extended position;

a multistage piston assembly disposed in longitudinally axial alignment with the central support tube of the stuffing horn assembly, including a first stage piston having an article contacting face, adapted to move from a first position wherein said article contacting face is disposed at the rearward end of the article-loading chamber, through said article-loading chamber into a second position wherein said article contacting face is disposed at the flared inlet end of said central support tube, and a second stage piston having an article contacting face, coaxially mounted inside said first stage piston and adapted to move from a first position wherein said article contacting face is disposed at the flared inlet end of the central support tube, through the central support tube into a second position wherein said article contacting face is disposed at the discharge end of the central support tube, said first stage piston comprising a first elongated tubular member and an annular piston head mounted at the forward end of said first elongated tubular member and carrying said article contacting face, said first elongated tubular member and annular piston head being of a size which will enable both to fit snugly inside said article-loading chamber after said compression bar has been moved to its extended position but without prohibiting movement therethrough and having a length such that the combined first elongated tubular member and annular piston head are substantially coextensive in the longitudinal direction with said article-loading chamber, and said second stage piston comprising a second elongated tubular member carrying said article contacting face at the forward end thereof, said second elongated tubular member being of a size which will enable it to fit snugly inside the central support tube of said stuffing horn assembly but without prohibiting movement therethrough and having a length such that said second elongated tubular member is substantially coextensive in the longitudinal direction with said central support tube;

air passage means arranged and disposed for the venting of air expelled from said central support tube and from the packaged article being formed;

shirred casing holding means disposed coaxially on the stuffing horn assembly, arranged and disposed to provide a continuous shirred supply of casing to be stuffed with said meat articles; and holding means arranged and disposed for restraining said continuous shirred supply of casing during stuffing of said flexible tubular casing.

7. Apparatus according to claim 6 wherein the second elongated tubular member of said second stage piston is the outer tubular wall of a pneumatic cylinder having an actuating rod extending outwardly from one end thereof in a direction opposite to said central support tube of said stuffing horn assembly and wherein said actuating rod is permanently anchored in a stationary position.

8. Apparatus according to claim 7 wherein said pneumatic cylinder includes an inner circular piston disk separating the interior of said cylinder into at least two portions and means associated with said actuating rod for introducing pressurized air to one portion of said pneumatic cylinder to effect movement of said second stage piston in one direction and for separately introducing pressurized air into another portion of said pneumatic cylinder to effect movement of said second stage piston in an opposite direction.

9. Apparatus according to claim 8 wherein said means for separately introducing pressurized air into said pneumatic cylinder comprises an inner tube concentrically mounted inside said actuating rod and communicating with one portion of said pneumatic cylinder through a central opening in said piston disk attached to an end of said actuating rod.

10. Apparatus according to claim 9 wherein said means for separately introducing pressurized air into said pneumatic cylinder further includes at least one aperture in said actuating rod communicating between the other portion of said pneumatic cylinder and an annular space defined between said rod and said inner tube.

11. An apparatus for stuffing large meat articles into discrete lengths of flexible tubular casing comprising, in combination:

a frame;

a stuffing horn mounted on said frame, having a discharge end and an inlet end;

an article-loading chamber in communication with the inlet end of the stuffing horn;

a compression member extending longitudinally in said article-loading chamber, movable between a retracted position and an extended position, the size of said article-loading chamber being approximately the same in cross section as the size of said stuffing horn when said compression member is moved fully to its extended position;

an elongated piston disposed in longitudinally axial alignment with the article-loading chamber and stuffing horn, said piston comprising the outer tubular wall of a pneumatic cylinder having an actuating rod extending outwardly from an end thereof in a direction opposite to said stuffing horn, said outer tubular wall being of a size which will enable said pneumatic cylinder to fit snugly inside said article-loading chamber and stuffing horn and having a length such that said cylinder is substantially coextensive in the longitudinal direction with said chamber and stuffing horn;

means operably connected to said pneumatic cylinder for actuating and moving said cylinder through said article-loading chamber and said stuffing horn;

and a shirred casing supply disposed coaxially on the stuffing horn arranged and disposed to provide a continuous deshirred casing to be stuffed with said meat article.

* * * * *

UNITED STATES PATENT AND TRADEMARK OFFICE
CERTIFICATE OF CORRECTION

PATENT NO. : 4,516,387

DATED : May 14, 1985

INVENTOR(S) : Vytautas Kupcikevicius

It is certified that error appears in the above-identified patent and that said Letters Patent is hereby corrected as shown below:

Column 12, line 15, insert a semicolon (;) after the word "end" in the second instance.

Signed and Sealed this

Eighth Day of October 1985

[SEAL]

Attest:

Attesting Officer

DONALD J. QUIGG

Commissioner of Patents and Trademarks—Designate